Aug. 25, 1959 CHAANG HUANG 2,901,638

TRANSISTOR SWITCHING CIRCUIT

Filed March 12, 1954 3 Sheets-Sheet 1

INVENTOR
CHAANG HUANG
BY Paul S. Martin
ATTORNEY

Aug. 25, 1959 CHAANG HUANG 2,901,638
TRANSISTOR SWITCHING CIRCUIT
Filed March 12, 1954 3 Sheets-Sheet 2

INVENTOR
CHAANG HUANG
BY Paul S. Martin
ATTORNEY

INVENTOR
CHAANG HUANG
BY Paul S. Martin
ATTORNEY

United States Patent Office 2,901,638

Patented Aug. 25, 1959

2,901,638

TRANSISTOR SWITCHING CIRCUIT

Chaang Huang, Ipswich, Mass., assignor, by mesne assignments, to Sylvania Electric Products Inc., Wilmington, Del., a corporation of Delaware Application March 12, 1954, Serial No. 415,851

Claims priority, application Canada July 21, 1953

6 Claims. (Cl. 307—88.5)

The present invention relates to "large signal" or switching transistor circuits. The invention applies generally to control systems and finds special application in computing circuits, such as counters, coincidence detectors, and a variety of elemental logic building blocks for use in computing and telemetering.

Transistor circuits have attained a wide scope of application for switching, and in such application their bistable characteristic has been utilized for triggering the associated output circuit from a low current stable condition to a high current stable condition in response to a control pulse, without particular regard to the waveform of the control or triggering pulse. Such bistable transistor switching circuit traditionally has been complex. It usually involves a large number of gating diodes or additional transistors in association with the bistable transistor for isolating the respective control signal sources from each other, as where multiple control signal sources are to be used in accomplishing a joint function.

Thus, it is known in the field of computers to employ a logical "and" circuit and a logical "or" circuit as elemental computer building blocks. The "and" logical building block is to cause transistor switching from one condition to another only in response to coincidence of signals from each of multiple input signal sources. The "or" logical building block involves multiple signal sources in combination with the switching transistor in such arrangement that switching is effected in response to a pulse from any one of the multiple input signal sources. These circuits are further complicated in larger systems, well known per se in the computer art, to take into account the "and/or" logical concept by combining the simple functions of the elemental "and" and "or" transistor building blocks.

The present invention is concerned with systems of the foregoing classes in vastly simplified and improved forms, utilizing a multiple-emitter bistable transistor. In one form each of the emitters is effective of itself to cause switching from one of two stable states to the other. As a further form of the invention the multiple-emitter transistor is reversed in condition only by coincidence of signals at all of the emitters. Moreover, both these concepts can be utilized in a single transistor circuit.

The invention relates to transistor circuits where two emitters are separately associated with the collector of a current-multiplying transistor. Either emitter will sustain high current in the output circuit where such one emitter is in properly energized condition for emitting minority carriers. Thus, in a transistor having an N-type body, if any one of multiple emitters is in condition to emit holes, the transistor will remain in stable high-conduction condition even though the other emitter or emitters is reversely energized. On the other hand, if all of the emitters are instantaneously in stable low-conduction condition, the collector circuit will be in low-current condition. It takes a reversal into hole-emitting condition of only one emitter to reverse the transistor into its high-current state; it takes all of the emitters conditioned for low, backward conduction to shift a high-conducting bistable transistor into its low-current state.

Because of the foregoing fundamental properties, the novel bistable multiple-emitter transistor circuit is applicable in switching circuits where it achieves remarkable new results, especially in respect to stability and simplification in certain applications. In one application, the multiple-emitter switching transistor circuit will be understood to replace, in function, a pair of switching transistors having a common output circuit with manifest savings in circuit complexity and reliability. Such switching applications, using large signals without regard to waveform, contrasts markedly with so-called "small-signal" reproducing circuits, for example, as that disclosed in the article, "A Crystal Mixer," by Rowland Haegele, in The Sylvania Technologist (published by Sylvania Electric Products Inc.), July 1949, at pp. 2–4.

Practical embodiments described below deal with the elemental "and" and "or" and "and/or" transistor building blocks; specific attention will not be given to the wide variety of circuit applications to which the invention will be found applicable, but it should be understood that the invention broadly finds generalized applications in switching circuit not necessarily identified with these logical functions. That the invention is extensively applicable to computers, may be seen from an article by J. H. Felker entitled "Typical Block Diagrams for a Transistor Digital Computer," published April 17, 1952, and available from the American Institute of Electrical Engineers, in which such computer building blocks are discussed.

As a special feature of the invention, a serial binary adder may be constructed such that the logical "or," "reset" and "inhibition" functions are achieved with a single multiple-emitter transistor building block. This eliminates plural external gating diodes in association with triode transistors and the incident circuit complexity found in a known form of serial binary adder.

As a still further illustrative application, a materially simplified logical "and/or" transistor component, finding many and diverse application, may be built using a multi-emitter transistor wherein the logical "or" function is accomplished without the need for external gating diodes.

The invention and its further fetaures of novelty will be better understood in the following detailed disclosure of its principles, an illustrative embodiment being represented in the annexed drawings and forming part of this disclosure.

In the drawings:

Fig. 1 is the wiring diagram of a single-emitter bistable transistor circuit known in the art;

Figs. 2 and 3, respectively, are diagrammatic representations of the emitter and base characteristics of the bistable transistor circuit of Fig. 1;

Figure 1:
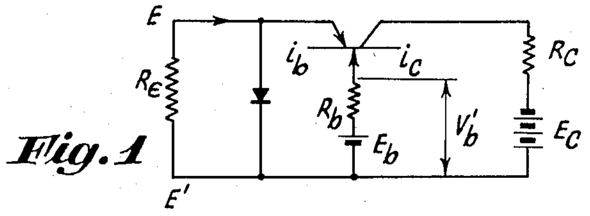
Figure 2:
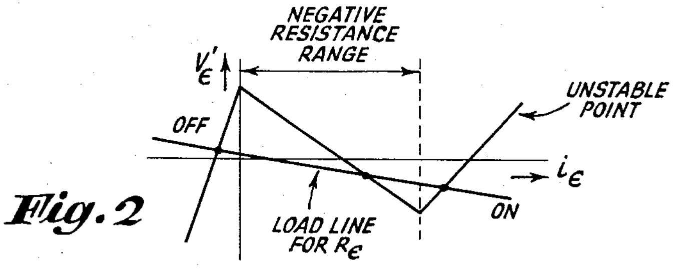
Figure 3:
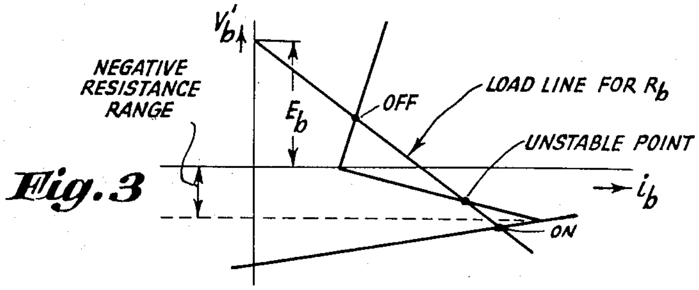

The principle of a single-emitter transistor bistable circuit, as diagrammatically represented in Fig. 1, may be understood from a consideration of the emitter and the base input characteristics shown respectively in Figs. 2 and 3. Referring specifically to Figs. 1 and 2, with the terminals E, E′ considered as input terminals, by using the equivalent circuit of the transistor, the emitter input characteristic can be plotted from the following equation:

(1)

$$V'_\epsilon = i_\epsilon\left[R'_b + r_\epsilon - \frac{(R'_b + \alpha r_c)R'_b}{R'_b + R_c + r_c}\right] + E_b - \frac{E_b + E_c)R'_b}{R'_b + R_c + r_c}$$

$$R'_b = R_b + r_b$$

where $r_b$, $r_\epsilon$ and $r_c$ are the base, emitter and collector resistances of the transistor, $R_b$ and $R_c$ are the external base and collector resistances, $\alpha$ is the circuit current gain, $E_b$ and $E_c$ are the base and collector biases which bias the collector and the emitter negative relative to the base. When the values are chosen for $R_b$, $R_c$, $E_b$, and $E_c$, the above Equation 1 can be plotted as shown in Fig. 2. The load line for the emitter external resistance $R_\epsilon$ intersects the emitter input characteristic at three points; two of these points are stable and are respectively marked "off" and "on" in the diagram. The transistor will be locked in either of these two states. It can easily be seen that, for an N-type transistor, when a positive pulse is applied to a single emitter of a transistor in "off" condition, the transistor will be turned "on"; when a negative pulse is applied to the emitter, the transistor will be turned "off."

The relationship between the various components of the single emitter bistable transistor that is effective to produce the bistable characteristic will be appreciated from a visual inspection of Fig. 2 and from consideration of the emitter input characteristic Equation 1. When the emitter current is "low" and in "reverse" condition in the sense of diode operation, it is observed that the slope of the characteristic is positive indicating a positive resistance region. For this condition the coefficient of $i_\epsilon$ should be positive. This is realized since $r_\epsilon$ is large due to emitter-base diode section being biased in the back direction, that is the emitter current is negative; the base is positive relative to the emitter. Further, alpha is zero for there is no injection of minority carriers.

When the emitter current is positive, but not sufficient to cause saturation in the collector circuit, the coefficient of $i_\epsilon$ should be negative such that the negative slope for the input characteristic and the corresponding negative resistance range is realized. For this region of the characteristic $r_\epsilon$ is small because the emitter-base diode section is conducting, and as such, this term is of no consequence in the coefficient. Further, alpha is large due to injection of minority carriers, and thus the circuit parameters may be selected such that the coefficient is negative. The saturation condition has not been reached in this region.

In the saturation region, where the input characteristic is positive indicating a positive resistance region, increases of emitter current do not cause appreciable increase in the collector current. Therefore alpha becomes relatively small such that the $R'_b$ term is dominant and the coefficient of $i_\epsilon$ again becomes positive.

The above discussion concerns the use of linear external impedances, but it is to be appreciated that the bistable transistor switching characteristic may be obtained by other means, such as disclosed in my copending application, Serial No. 401,657, filed December 31, 1953.

Reference will be now made to Figures 1 and 3 for obtaining a corresponding plot of the base input characteristic, with the terminals E, E' considered as input terminals and by use of the following equation:

(2)

$$V'_b = i_b\left[r_b + r_\epsilon + R_\epsilon + \frac{(\alpha r_c - r_\epsilon - R_\epsilon)}{R_c + R_\epsilon + r_\epsilon + (1-\alpha)r_c}\right] - \frac{E_c(r_\epsilon + R_\epsilon)}{R_c + R_\epsilon + r_\epsilon + (1-\alpha)r_c}$$

With the same choice of values $R_c$, $E_c$ and R as with the emitter input, Equation 2 can be plotted as shown in Fig. 3. The load line for $R_b$ intersects the base input characteristic at three points; two of these points are stable and are respectively marked "off" and "on" in Fig. 3. The transistor will be locked in either of the two stable states. A negative pulse applied to the base, therefore, will turn the transistor "on" and a positive pulse will turn the transistor "off."

The two stable states in each of Figures 2 and 3 will be recognized as positive resistance regions of the characteristics and the intermediate unstable region intersected by the respective load lines in Figs. 2 and 3 will be recognized as a negative resistance region of the characteristic. As stated in my copending application aforesaid, the high-current stable state may be produced in the negative resistance region of the input characteristic, using a non-linear external impedance.

The several illustrative examples to be described utilize a current-multiplying transistor having multiple rectifying input or emitter connections spaced from a rectifying output or collector connection by a small distance appropriate to individually induce current multiplying interaction. While only two emitters are shown illustrating the tetrode form of the switching transistor, additional emitters may be employed depending upon the circuit requirements. The multiple-emitter transistor as a component, apart from the circuit and mode of operation is known and may include for example, a body of N-type semiconductive germanium having an ohmic connection as a base, a pair of Phosphor bronze sharp-ended wires engaging a conventionally etched surface of the germanium body so as to be good "hole" emitters, together with a collector electrically pulsed to impart low leakage high-rectification-ratio characteristics.

Figure 4:
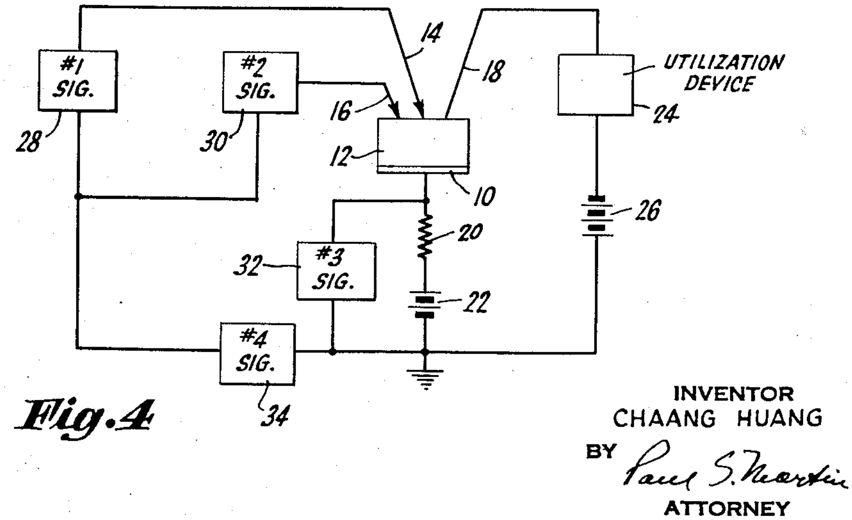
Fig. 4 is a diagrammatic circuit of a multiple-emitter transistor circuit embodying features of the present invention.

In Fig. 4 a transistor of the type described is incorporated in a circuit illustrating the several logic functions which may be accomplished including the "and" function, the "or" function, the "inhibition" function, and the "reset" or "clearing" function. The described current multiplying transistor includes an ohmic base 10 on an N-type germanium body 12 engaged by multiple rectifying emitters 14, 16 and a single rectifying collector 18. In the base circuit of the transistor are a base resistor 20 and a direct current supply 22 arranged in series between the ohmic base or electrode 10 and ground. In the collector circuit are a utilization device or load 24, and an appropriate collector bias supply 26, which is arranged to provide negative biasing potential to the collector. Four signal sources 28, 30, 32, and 34, appropriately of pulse form are shown in the emitter and base circuits which may be used together; or source 32, and/or source 34 may be omitted, as dictated by the functions to be accomplished and as will appear from the following detailed description. Signal sources 28 and 30 are connected between the emitters 14 and 16 respectively and ground; but an additional signal source may be interposed in the return circuit from the respective sources 28 and 30 to ground. The additional signal source 32, serving to illustrate the "reset" function is connected between the base electrode 10 and ground to impress its output across the base resistor 20. Suitable direct current paths are included in each of the emitter signal sources 28, 30 such that the bias of the base supply 22 may impress its negative potential on the respective emitters 14, 16. Appropriately the collector 18 is biased negatively with respect to the base 10. As will be readily appreciated by those skilled in the art, transistors may be employed embodying P-type semiconductors having their respective emitters and the collector 18 biased positive with respect to ground, and base 10 biased negative with respect to ground.

Assuming that the source 34 in series with both the emitter inputs 28, 30 is in condition to impress "on" triggering potential to the respective emitters at a time when the transistor circuit has shifted the transistor to its "off" or "low-current" condition, that is the pulse is positive but in an amount insufficient to trigger the transistor to the "on" condition, a positive or "or" pulse in either emitter signal source 28, 30 will drive the transistor from its "off" or "low-current" stable condition to its "on" or "high-current" stable condition. If the transistor is shifting into its "high-conduction" stable condition, or if it is in that condition, a negative pulse in either emitter supply 28, 30 will be ineffectual to retain or return the transistor to its "low-conduction" condition. In the emitter supplies 28, 30 only the coincidence of negative pulse will drive the transistor from "high-conduction" back into its "low-conduction" stable state. It makes no difference that the triggering potentials decay and disappear after the switching function is achieved, for the circuit parameters are appropriate to maintain the transistor in the new stable condition, and in this sense the circuit serves as a memory device. Stated in terms of logic functions, where both emitter supplies 28, 30 must coincide such that their triggering pulses are effective for switching, an "and" circuit is said to exist; where either of the emitter sources alone is effective for triggering or switching the circuit, an "or" circuit is said to exist.

The base signal source 32 can be made effective to apply either positive or negative potential on the respective emitters in relation to the base. Thus, in computers where the signal sources 28, 30 are frequently employed to accomplish an "or" function, the base signal source 32 can be used for reset purposes. As a further example, the signal sources 28, 30 may be radiation detectors arranged to operate a counting device only in response to coincidence of radiation detection. In this example, after the transistor is driven to the "low-current" stable state by detection of a coinciding pair of negative pulse signals applied at the respective emitters, the base signal source or supply 32 may thereafter produce a single negative impulse for resetting the transistor to the "high-conduction" stable state in condition to detect the next coinciding pair of emitter signals indicating "count."

The series signal supply or source 34 in circuit with both the emitter supplies or sources 28, 30 may be rendered effective to satisfy the logical "and/or" function by supplying an enabling pulse of itself insufficient to drive the transistor from one stable condition to the other. The circuitry is such that when either emitter supply 28, 30 produces its respective pulse the combined effect of the common signal supply 34 and one of the emitter supplies is effective to trigger the transistor. In the connection it is to be observed that the individual emitter supplies 28, 30 should be ineffectual to initiate operation without the cumulative effect produced by the common signal supply 34. This represents the "or" and the "inhibition" logic functions concurrently. With source 34 and its function omitted, the magnitude of the pulses in sources 28, 30 is made high enough to be controlling, as is apparent.

Although the single circuit Fig. 4 combines several of the basic logic functions used in computers, it is to be appreciated that this circuit generally illustrates the several functions; omission of appropriate signal sources will readily illustrate the individual logic functions. Several specific applications as illustrative embodiments will now be described.

Figure 5:
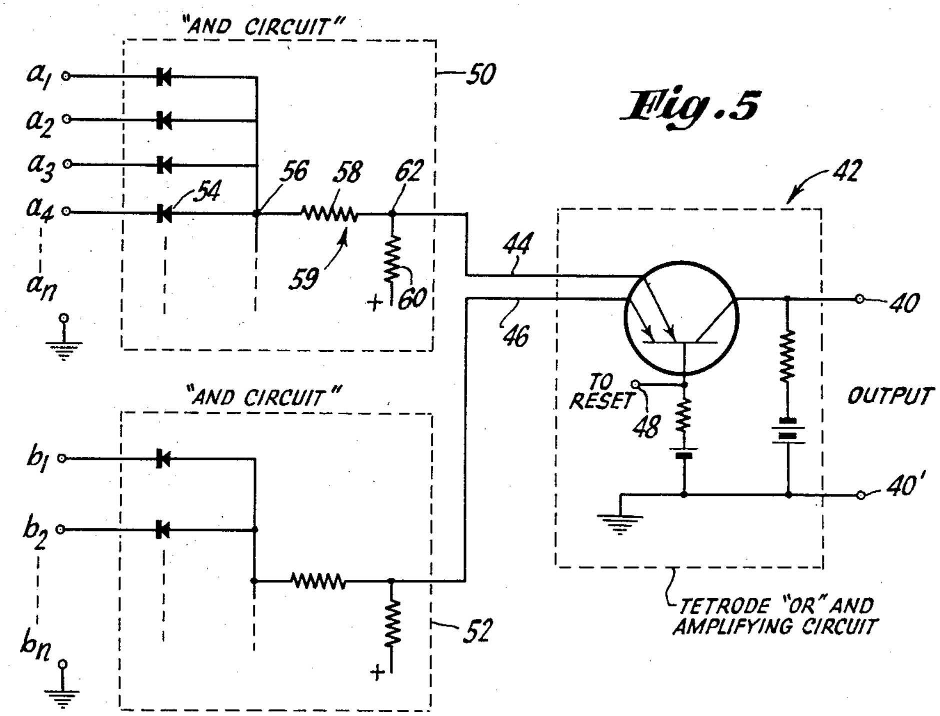
Fig. 5 is a diagrammatic circuit of an "and/or" circuit embodying a multi-emitter transistor in accordance with further aspects of the invention.

Referring now specifically to Fig. 5, there is shown an "and/or" building block having a switching transistor which finds widespread application in the computer field, such as in the control, sequence, and arithmetic circuits. The building block illustrated is but one of many which may be connected in cascade such that the outputs at the terminals 40, 40' is applied as input signals at further "and/or" building blocks. The multiple-emitter switching transistor, generally designated by the numeral 42, is of the type previously described in connection with Figs. 1–4 inclusive, for example, being switched from the "low-conduction" condition to the "high-conduction" condition in response to positive pulses at either of the emitter inputs 44, 46, and restored to the "low-conduction" stable condition in response to positive resetting pulses, at the base or reset terminal 48. In accordance with the particular circuit requirement, any number of individual "and" circuits 50, 52 may be associated with the multiple emitters; in the illustrative case, two "and" circuits 50, 52 are connected respectively to the "or" emitter inputs 44, 46.

"And" circuit 50 includes an arbitrary number of diode branches 54 connected individually to the input terminals $a_1 \ldots a_n$ and having a common output 56 connected through the series resistor 58 of a voltage divider 59 to the emitter 44. The shunt resistor 60 of the voltage divider 59 is connected to an appropriate source of potential such that when any of the inputs $a_1 \ldots a_n$ is negative relative to a reference, the potential at the output 62 of the voltage divider 59 is insufficient to switch the transistor circuit 42, that is, the associated emitter is negative relative to the base. For example, the input voltages at terminals $a_1 \ldots a_n$ may be −5 volts corresponding to the "high-conduction" state and −45 volts corresponding to the "low-conduction" state, while the potential applied to the voltage divider return may be selected as +45 volts, with the series resistance arm 58 of 3000 ohms and the shunt resistance arm 60 of 10,000 ohms. If one terminal, as $a_1$, has −45 volts applied when any other terminal, as $a_z$, has −5 volts applied, the diode associated with the −45 volt branch will be forward conducting and the diode in that other branch will be biased in the reverse direction so as to be effectively non-conducting. When any one of the inputs $a_1 \ldots a_n$ is at the "off" potential of −45 volts, the associated diode branch will cause the output 62 of the voltage divider 59 to be insufficient for transistor switching from "low-conduction" condition; however, when all of the diode branches have the "on" potential of −5 volts individually applied thereto, there will be a relatively small potential drop across the respective diodes. The output of the voltage divider at terminal 62 will be sufficiently positive relative to the base to cause transistor switch to "on" condition.

"And" circuit 52 is the same in construction and operation as circuit 50. The outputs of the respective "and" circuits 50, 52 are positive only if all of the inputs at the terminals $a_1 \ldots a_n$, or at the terminals $b_1 \ldots b_n$ are biased "on."

In the tetrode transistor switching circuit 42, either of the individual emitter-base sections functions as an "or" operation to cause switching in response to the logical "and" function being performed by all the inputs of any one of the circuits 50, 52. Although this utilization of the tetrode switching transistor 42 is in conjunction with the diode type of "and" circuit, the present teachings find equal application to other "and" circuits in achieving the logical "and/or" function, such as the multi-emitter transistor "and" circuit of Fig. 4. Reset of the multiple-emitter transistor switching circuit is accomplished by applying positive reset pulses to the base terminal 48, as previously described.

In accordance with a further aspect of the invention, a serial binary adder may be constructed utilizing multiple-emitter, current-multiplication transistors to replace complicated diode and transistor networks in a broadly comparable known adder. Briefly, the adder includes a first half-adder section 64 that is useful as a unit. This half-adder performs the "addition" process without "carry." A duplicate second half-adder section 66 is included, which performs the "carry" process and having an output 68 at which a series of electrical impulses may be derived with a pattern representing the binary addition of an augend and addend.

The first half-adder 64 includes an "or" section 70 having a two-emitter or tetrode transistor 72, comparable to that disclosed in Fig. 4 with source 34 omitted and with a "reset" source providing pulses of a sign to induce low-conduction. Additionally, the first half-adder includes an "and" section 74 illustrated as a triode transistor 76 with an "and" or external gating network 78. This is like unit 50 in Fig. 5 and has two diode branches 80, 82. The collector circuit of the triode transistor 76 is connected via a blocking condenser 84 and a unidirectional device 86, shown as a point-contact rectifier, to the base circuit of the tetrode switching transistor 72 of the "or" section 70. This interconnection between the "and" section 74 and the "or" section 70 provides for inhibition of the output at the collector of the "or" circuit 70 when there is an amplified positive output of the "and" section 74. This occurs upon coincidence of positive signal input at the individual diode branches 80, 82 of the input network 78. This inhibition is operative to suppress output from switching transistor 72 when "on" signal is applied to both of its emitters.

The semiconductor bodies in units 72, and 76 are expediently of the same type of semiconductor, as of N-type material. It is within the contemplation of the present invention to substitute for the triode transistor 76 and the external "and" network 78, a single tetrode switching transistor designed as an "and" circuit with a P-type semiconductor body in accordance with the disclosure of Fig. 4 where the signal inputs 28, 30 are coincident yet are effective to switch the transistor "off."

Input terminals 88, 90 are provided individually to the emitters of the tetrode switching transistor 72 for applying separate signal sources to the emitters. The separate signal sources are in the form of pulse or information bits corresponding to binary representations of an augend and an addend, as is well understood. Appropriate connections are extended to the input branches 80, 82 of the "and" circuit 74 such as to obtain parallel signal feed to units 72 and 78.

Respective reset or clearing connections 92, 94 are provided for the "or" section 70 and for the "and" section 74. The reset connections effective at the base of the tetrode transistor 72, and at the base of the triode transistor 76 are isolated by diodes as shown and may be connected to a common source of positive reset pulses. At the end of each digit interval the first half-adder 64 is cleared preparatory to the next digit interval.

Since the second half-adder section 66 is a substantial duplicate of the first adder section 64 corresponding components will be indicated by the same numerals having primes applied thereto. One emitter input terminal 88′ of the second half-adder 66 is connected via coupling condenser 96 to the collector of the transistor switching tetrode 72 of the "or" circuit 70. The other emitter input terminal 90′ is connected to the collector of the transistor 76 of the "and" section 74 of the first half-adder 64 through an appropriate one-digit time delay circuit 98 and through one diode branch 102 of a diode "or" circuit 100 and coupling condenser 104. An additional connection to the emitter input terminal 90′ is provided from the collector or output 106 of the "and" section 74′ of the second half-adder 66 via a coupling condenser 108, the other diode 110 of the "or" circuit 100, and the delay circuit 98. The delay circuit 98 can be of any well-known form, such as a monostable triode transistor having a recovery time equal or adjustable to the digit time interval, or an electrical delay line having a recovery time equal to the digit time interval. Alternatively, the external diode "or" circuit 100 and the monostable triode transistor 98, can to advantage be replaced by a single switching tetrode embodying features of this invention. Such transistor would have a stable "off" positive resistance region in the characteristics of each of two emitters (just as in the case of the monostable triode transistor), and a region of negative resistance providing an unstable state.

Figure 6A:
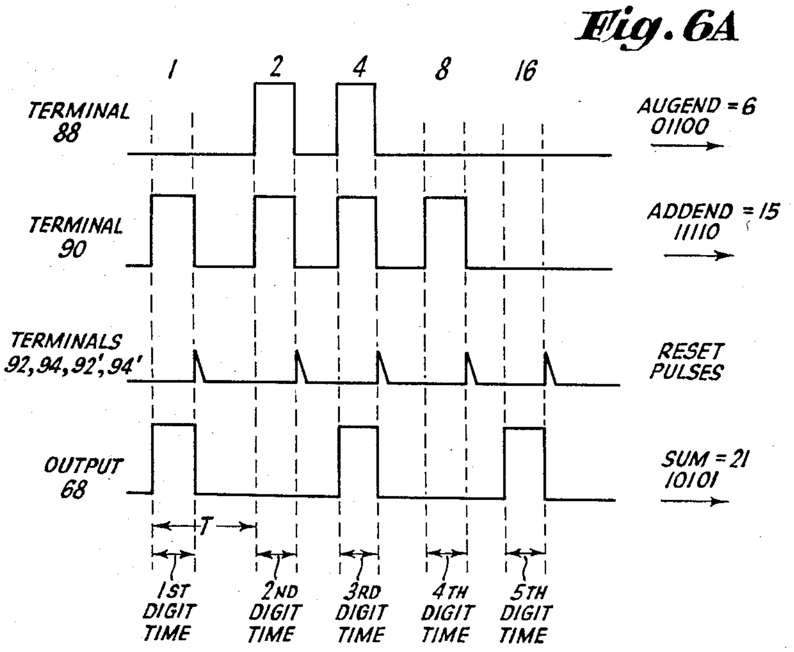
Fig. 6 is a diagrammatic circuit of a serial binary adder embodying still further features of the present invention; and, Fig. 6A is a time relationship diagram showing the waveform for a typical binary addition performed by the circuit of Fig. 6.
Figure 6:
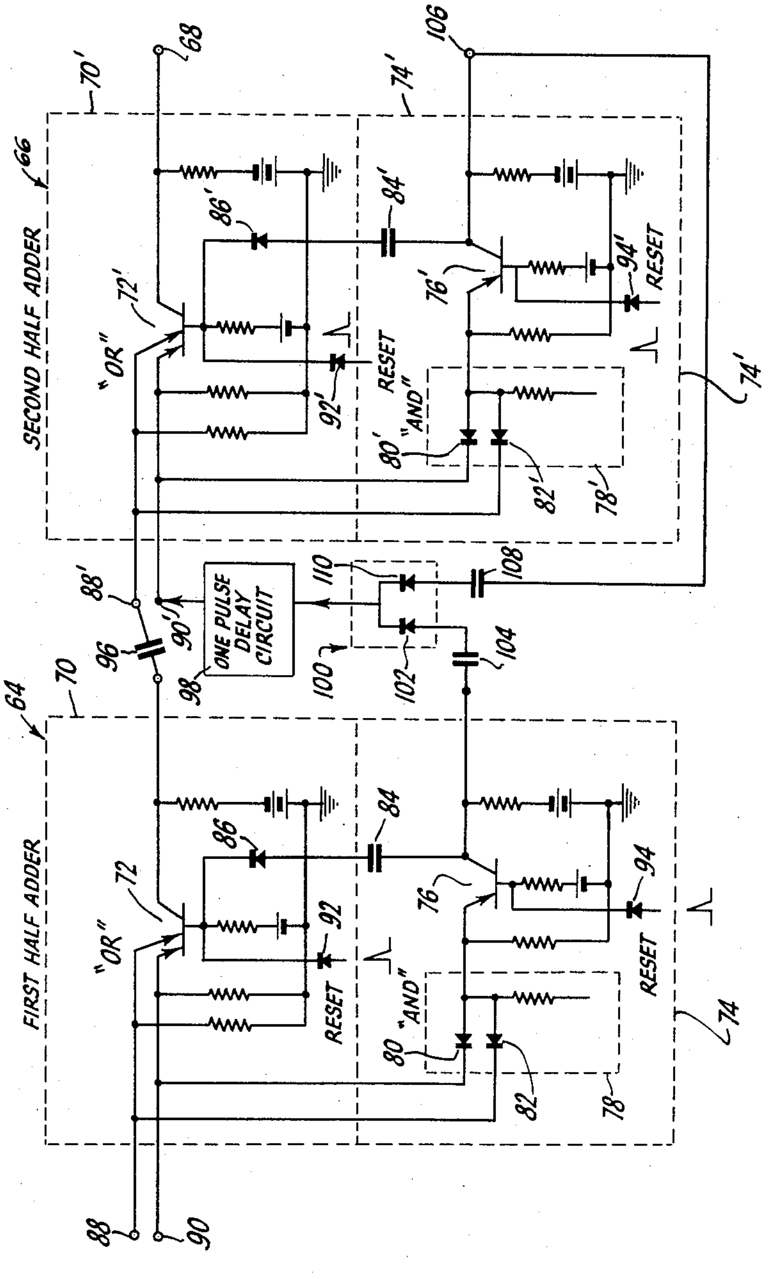

In order to more fully appreciate the function of the serial binary adder shown in Fig. 6, reference will be made to the time relationship diagram of Fig. 6A which shows waveforms typical of an illustrative binary addition. In the binary addition of the augend "6," represented by pulses during the second and third digit times, and the binary addition of the addend "15," represented by pulses during the first to fourth digit times, it will be appreciated by the binary principle that the following functions must be performed in the respective digit intervals or periods:

*First digit interval.*—The "no-pulse" of the augend "6" and the "pulse" of the addend "15" should result in an output pulse at terminal 68.

*Second digit interval.*—The "pulse" of the augend and the "pulse" of the addend should result in "no-pulse" at the terminal 68, with production and storage of a "carry-pulse" in the first half-adder section 64.

*Third digit interval.*—The "pulse" of the augend and the "pulse" of the addend should result in "no-pulse" at the emitter-input terminal 88′, but the "carry-pulse" produced during the second digit interval should be effective to produce an output pulse at the terminal 68. Further a "carry-pulse" should be produced in the second-half adder 66 and stored for utilization during the fourth digit interval.

*Fourth digit interval.*—The "no-pulse" of the augend and the "pulse" of the addend should result in a "pulse" at the emitter-input terminal 88′, but should be effective with the "carry-pulse" produced in the second-half adder during the third digit interval to produce no output at the terminal 68, but storage of a carry pulse to be effective during the fifth digit interval.

*Fifth digit interval.*—With no binary input to the terminals 88, 90, the "carry-pulse" produced in the second-half adder during the preceding interval should be effective to provide an output pulse at terminal 68.

The above requirements are met by the present circuit to achieve the illustrative binary addition as follows:

During the first digit interval, the "no-pulse" of the augend and the "pulse" of the addend applied at input terminals 88, 90 cause an amplified output in the collector circuit of the "or" section 70 of the first-half adder 64. This output pulse is applied via the coupling condenser 96 to the emitter input terminal 88′ to cause an amplified output in the collector circuit of the "or" section 70′ of the second-half adder 66 and at the output terminal 68 of the adder. The "and" circuit 74 of the first half-adder 64 is ineffective absent coincident input signals at branches 80, 82; likewise the "and" circuit 74′ of the second half-adder 66 is ineffective. Upon occurrence of the reset pulses at the end of the first digit interval (see Fig. 6A) the adder sections are cleared for the next binary adding function.

During the second digit interval, the "pulse" of the augend and the "pulse" of the addend applied at the input terminals 88, 90 appear as coinciding signal input at the input network 78 of the "and" section 74 of the first-half adder. This produces an amplified positive output in the collector circuit of the triode transistor 76 which is effective via the condenser 84 and the diode 86 to inhibit the "or" section 70 of the half-adder section 70, despite input triggering to transistor 72. The result at the emitter input connection 88′ to the second half-adder is the occurrence of a "no-pulse," with no output at the terminal 68. However, the amplified output of the "and" section 74 is effective via the condenser 104 and the diode branch 102 of the "or" circuit 100 to store a "carry pulse" in the one-pulse delay circuit 98. As previously pointed out, the delay of the circuit is appropriate to cause the stored "carry pulse" to manifest itself during the next digit interval. Occurrence of the second reset pulse conditions the half-adder sections for the next binary function.

During the third digit interval, the "pulse" of the augend and the "pulse" of the addend are effective in the first half-adder section 64, as described for the second digit interval, to produce a "no-pulse" at the emitter input terminal 88′ due to inhibition of the "or" circuit 72. However, the "carry-pulse," stored in the delay circuit 98 during the preceding interval is effective at emitter input terminal 90′ to operate the "or" circuit 70′ of the second half-adder resulting in output at the terminal 68. Once again, due to coincident signal input to the "and" section 74, a "carry pulse" is stored in the delay circuit 98 which will become effective during the next digit interval. As is well understood, the single signal input to the second half-adder cannot cause operation of the "and" circuit 76′. Occurrence of the third reset pulse conditions the half-adder sections for the next binary function.

During the fourth digit interval, the "no-pulse" of the augend and the "pulse" of the addend are effective in the first half-adder 64, as described for the first digit interval, to produce a "pulse" at the emitter-input terminal 88′. Concurrently, at the emitter-input terminal 90′, the "carry pulse" stored during the third digit interval becomes effective. These concurrent input signals to the second half-adder are effective in the "and" section 74′ to inhibit the "or" section 70′ resulting in no output at terminal 68. However, the amplified output of the "and" section 74′ at its output terminal 106 is effective via the condenser 108, and the diode branch 110 of the "or" circuit 100 to store a "carry-pulse" in the delay circuit 98 which will manifest itself during the fifth digit time. Occurrence of the fourth reset pulse conditions the half-adder sections for the next binary function.

During the fifth digit interval, with no input to the first half-adder section 64, the single input to the second half-adder section 66, due to the "carry-pulse" at the emitter-input terminal 90′ is effective to switch the "or" section 72′ producing an output at terminal 68.

Thus, the adder produced outputs or pulse at terminal 68 during the first, third, and fifth digit intervals or times. As is apparent in Fig. 6A, this by binary principles indicates the addition of the numbers "1," "4" and "16," or the arithmetic sum "21."

Although only several of the many applications in the computing field have been described numerous others are within the scope and spirit of the present invention. Further, the more generalized application to switching circuits, not necessarily identified with logic functions, should be apparent from consideration of the various aspects and features of the present invention, and in certain instances use of one or more of the features is intended without a corresponding use of other features. Accordingly, the appended claims should be accorded a latitude of interpretation consistent with the spirit and scope of the invention.

What I claim is:

1. A semiconductor circuit including a transistor having a semiconductor body, a base electrode, multiple-emitter electrodes, and a collector electrode, individual input circuits connected to respective emitter electrodes, a common impedance connected to said base electrode and included in all of said input circuits, an output circuit connected to said collector electrode, means for providing back conducting bias to said collector electrode with respect to said base electrode, the parameters of said transistor and said input, base electrode and output circuits being related to provide an input characteristic having a stable low current state and a stable high current state, and circuit connection means to said common impedance for simultaneously impressing a signal between all the emitter electrodes and said base electrode effective to drive the transistor from one stable point of operation to the other stable point of operation.

2. A semiconductor circuit including a transistor having a semiconductor body, a base electrode, multiple emitter electrodes and a collector electrode on said body, individual input circuits connected to respective emitter electrodes, a common impedance connected to said base electrode and included in all of said input circuits, an output circuit connected to said collector electrode, means for providing back conducting bias to said collector electrode with respect to said base electrode, the parameters of said transistor and said input, base electrode and output circuits being related to provide an input characteristic having respective regions of positive resistance, separated by a region of negative resistance, and circuit connection means to said common impedance for simultaneously impressing a signal between all the emitter electrodes and said base electrode effective to drive the transistor from one of the regions of positive resistance to the other.

3. A semiconductor circuit including a transistor having a semiconductor body, a base electrode, plural emitter electrodes, and a collector electrode, individual input circuits connected to respective emitter electrodes, an output circuit connected to said collector electrode, means for providing back-conducting bias to said plural emitter and collector electrodes with respect to said base electrode, the parameters of said transistor and said input and output circuits being related to provide an emitter input characteristic having respective regions of low conduction, negative resistance, and high conduction, the emitter impedance of said transistor being related to said emitter input characteristic to provide stable operating points in said regions of low conduction and high conduction, and separate signal input sources for said emitter electrodes for switching the transistor from one stable operating point to the other stable operating point.

4. An "and" logic circuit including a transistor having a semiconductor body, a base electrode, plural emitter electrodes, and a collector electrode, individual input circuits connected to respective emitter electrodes, an output circuit connected to said collector electrode, means for providing back-conducting bias to said emitter and collector electrodes with respect to said base electrode, the parameters of said transistor and said input and output circuits being related to provide an emitter input characteristic having a region of negative resistance and multiple stable conduction states, and means for applying back-conducting signals coincidentally to said input circuits whereby said transistor is switched from one stable conduction state to another stable conduction state.

5. An "or" logic circuit including a transistor having a semiconductor body, a base electrode, plural emitter electrodes, and a collector electrode, individual input circuits connected to respective emitter electrodes, an output circuit connected to said collector electrode, means for providing back-conducting bias to said emitter and collector electrodes with respect to said base electrode, the parameters of said transistor and said input and output circuits being related to provide an emitter input characteristic having a region of negative resistance and multiple stable conduction states, and means for applying a forward-conducting signal to a selected input circuit of said transistor whereby the energized emitter electrode drives said transistor from one stable conduction state to another stable conduction state.

6. In a serial binary adder, a half adder section including "or" and "and" logic sections having common input connections, said "or" logic circuit including a transistor having two emitters, a collector, and a base, the circuit parameters of said transistor at each emitter being related to include a negative resistance region in the emitter input characteristic and to have a stable low-conduction state and a stable high-conduction state, two multiple separate signal sources coupled via said input connections to said emitters and each individually effective to switch said transistor between said stable low-conduction state and said stable high-conduction state, said "and" logic section having an output connection to said base and serving to inhibit said "or" logic section in response to coincidence of signals from said two separate signal sources.

(References on following page)

References Cited in the file of this patent

UNITED STATES PATENTS

| | | |
|---|---|---|
| 2,476,323 | Rack | July 19, 1949 |
| 2,610,790 | Elliott | Sept. 16, 1952 |
| 2,629,834 | Trent | Feb. 24, 1953 |
| 2,666,150 | Blakely | Jan. 12, 1954 |
| 2,673,293 | Eckert et al. | Mar. 23, 1954 |
| 2,686,632 | Wilkinson | Aug. 17, 1954 |

OTHER REFERENCES

"The Transistor," prepared by Bell Telephone Laboratories, Inc. for Western Electric Co. Inc., New York, N.Y., 1951, pages 703–718.

"High Speed Computing Devices," Engineering Research Associates, pages 272–275, copyright 1950, McGraw-Hill Book Co., Inc.